(12) United States Patent
Sakamoto

(10) Patent No.: US 9,081,270 B2
(45) Date of Patent: Jul. 14, 2015

(54) TABLE INSTALLING DEVICE

(71) Applicant: SEIKO EPSON CORPORATION, Tokyo (JP)

(72) Inventor: Kenji Sakamoto, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 109 days.

(21) Appl. No.: 13/893,730

(22) Filed: May 14, 2013

(65) Prior Publication Data

US 2013/0306842 A1 Nov. 21, 2013

(30) Foreign Application Priority Data

May 15, 2012 (JP) .................................. 2012-111576

(51) Int. Cl.
| G03B 21/14 | (2006.01) |
| G03B 21/54 | (2006.01) |
| F16M 11/04 | (2006.01) |
| F16M 13/02 | (2006.01) |
| H04N 9/31 | (2006.01) |

(52) U.S. Cl.
CPC ............. *G03B 21/54* (2013.01); *F16M 11/046* (2013.01); *F16M 13/022* (2013.01); *H04N 9/3141* (2013.01)

(58) Field of Classification Search
CPC . H04N 9/3141; H04N 9/3194; H04N 9/3197; G03B 21/14; G03B 21/26

USPC ........ 353/119, 122; 248/226.11, 231.71, 466, 248/476, 676, 678, 346.03, 918
See application file for complete search history.

(56) References Cited

U.S. PATENT DOCUMENTS

| 6,334,687 | B1 * | 1/2002 | Chino et al. ..................... 353/79 |
| 6,866,388 | B2 * | 3/2005 | Yang ............................... 353/70 |
| 7,824,039 | B2 * | 11/2010 | Takito et al. ..................... 353/69 |
| 2005/0248729 | A1 * | 11/2005 | Drucker et al. ................. 353/71 |
| 2006/0170886 | A1 * | 8/2006 | Kitabayashi ................... 353/122 |
| 2011/0001022 | A1 * | 1/2011 | Edinger ........................ 248/103 |
| 2012/0056973 | A1 * | 3/2012 | Yano .......................... 348/14.08 |
| 2013/0200119 | A1 * | 8/2013 | Ackeret et al. ................. 224/275 |

OTHER PUBLICATIONS

Table-projection Metal Fitting (mounting bracket) (ELPMB29), Seiko Epson Corporation, Epson Sales Japan Corporation, Dec. 14, 2011, http://www.epson.jp/osirase/2011/111214.htm.

* cited by examiner

*Primary Examiner* — Sultan Chowdhury
(74) *Attorney, Agent, or Firm* — Workman Nydegger

(57) ABSTRACT

A table installing device includes a fixing member fixed to a projector; a first holding member that holds the projector by holding the fixing member, and is installed so as to stand up with respect to a top plate upper surface of the table; a second holding member that is joined to the first holding member and is installed on the top plate upper surface; and a clamp portion that is joined to the second holding member, and interposes the top plate between the second holding member and the clamp portion.

6 Claims, 7 Drawing Sheets

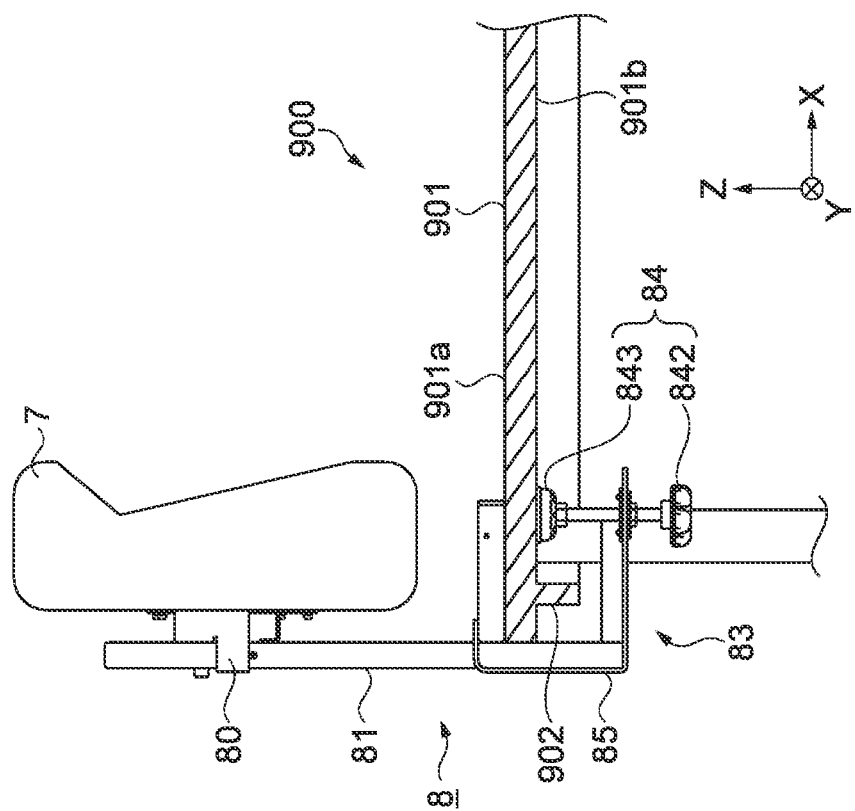
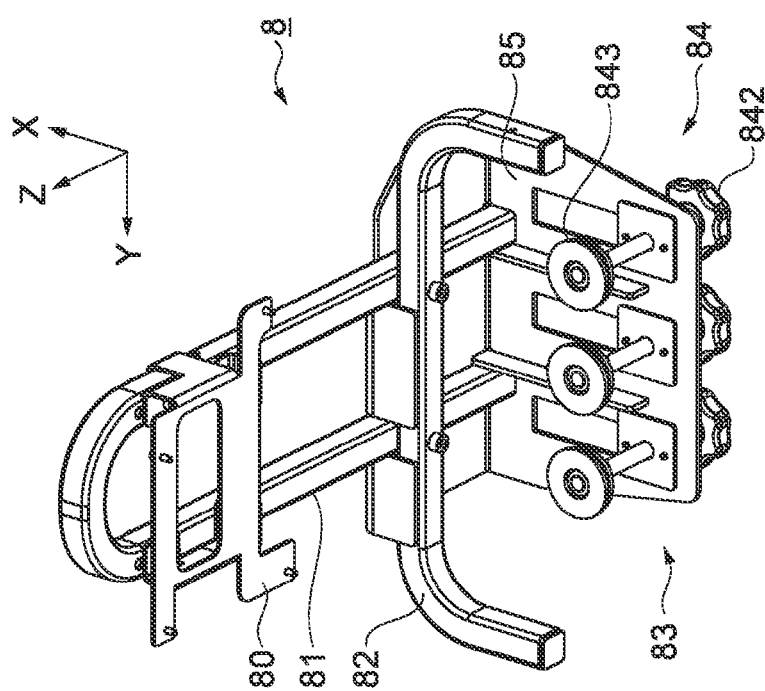
FIG. 7A
FIG. 7B

TABLE INSTALLING DEVICE

BACKGROUND

1. Technical Field

The present invention relates to a table installing device for a projector.

2. Related Art

In the related art, in some causes, a projector has been installed in a wall, a ceiling or the like using a wall-hanging device and a sky-suspending device, and has been used, by projecting images onto a screen or the like installed on a wall surface. Furthermore, in some cases, the projector has also been installed on a table using the table installing device, and has been used, by projecting the images onto a top plate surface of the installed table.

FIGS. 7A and 7B are views that show a table installing device 8 disclosed in Seiko Epson Corporation, "New Release", Table Projection Metal Fitting (ELPMB 29), [online], Dec. 14, 2011, [retrieval Apr. 25, 2012], internet <URL: http://www.epson.jp/osirase/2011/111214.htm>, FIG. 7A is a perspective view thereof, and FIG. 7B is a side view thereof.

As shown in FIGS. 7A and 7B, the table installing device 8 includes a fixing member 80 installed in a projector 7, and a first holding member 81 that holds the fixing member 80 and is approximately perpendicularly provided on a top plate 901 of a table 900. Furthermore, the table installing device 8 includes a second holding member 82 that is joined to the first holding member 81 and is installed on a top plate upper surface 901a. Furthermore, the table installing device 8 includes a clamp portion 83 that is joined to the first holding member 81 and the second holding member 82 and interposes the top plate 901 between the second holding member 82 and the clamp portion 83. Furthermore, the clamp portion 83 is constituted by a screw member 84, and a screw-holding member 85 that screws and holds the screw member 84 in a movable manner.

Regarding the installation (fixing) of the table installing device 8 to the top plate 901, first, the table installing device 8 is inserted from a side direction of the top plate 901, the second holding member 82 is located on the top plate upper surface 901a, and the screw portion 84 is installed so as to climb over a frame 902 installed on a top plate lower surface 901b. Thereafter, a pad 843 of the screw member 84 rotationally moves a knob 842 of the screw member 84 so as to press the top plate lower surface 901b. Thereby, the table installing device 8 is fixed to the top plate 901, by interposing the top plate 901 between the second holding member 82 and the clamp portion 83 by tightening of the screw member 84 (the clamp portion 83). With the table installing device 8, it is possible to perform the installation even when the top plate 901 is thick, or even when there is an obstacle such as a frame 902 on the top plate lower surface 901b.

According to the above-mentioned table installing device 8, when the screw member 84 is suitably rotated to fasten the top plate 901 by suitable fixing force, the screw-holding member 85 of the clamp portion 83 does not get deformed. However, when the screw member 84 is excessively rotated to fasten the top plate 901 by excessive fixing force, in some cases, the screw-holding member 85 may be deformed. When the screw-holding member 85 is deformed, there is a problem in that in the table installing device 8, stress due to the deformation is transmitted to the first holding member 81 joined to the screw-holding member 85, and the first holding member 81, which is installed approximately perpendicularly with respect to the top plate upper surface 901a, is slightly inclined.

The first holding member 81 is inclined and the position of the projector 7 is tilted, whereby the projection shape projected to the top plate upper surface 901a from the projector 7 does not have a predetermined shape (normally, a rectangular shape or a square shape), but is projected in a distorted shape (for example, a trapezoidal shape or the like). For this reason, when the position of the projector 7 is tilted, there is a need to operate the projection correction function incorporated in the projector 7, and perform the adjustment so that the distorted shape becomes a predetermined shape. In this manner, there was a problem in that, when installing the table installing device 8 and then adjusting the projected projection shape, convenience for setting of the table installing device 8 is degraded.

Thus, there has been a demand for a table installing device that improves the convenience of installation by suppressing the position of the projector from being tilted even when excessive fastening force is applied.

SUMMARY

An advantage of some aspects of the invention is to solve at least a part of the problems described above, and the invention can be implemented as the following forms or application examples.

Application Example 1

This application example is directed to a table installing device that installs a projector on a table, the device includes a fixing member fixed to the projector; a first holding member that holds the projector by holding the fixing member, and is installed so as to stand up with respect to the top plate surface of the table; a second holding member that is joined to the first holding member and is installed on the top plate surface; and a clamp portion that is joined to the second holding member and interposes the top plate between the second holding member and the clamp portion.

According to the table installing device, the fixing member is fixed to the projector. Moreover, the first holding member is installed so as to stand up with respect to the top plate surface of the table, and holds the projector via the fixing member. The second holding member is joined to the first holding member, and is installed on the top plate surface. The clamp portion is joined to the second holding member, and interposes the top plate between the second holding member and the clamp portion. With this configuration, the clamp portion is joined to the second holding member, but is not directly joined to the first holding member. In other words, the clamp portion is connected to the first holding member via the second holding member. Thus, even when the clamp portion is deformed by the addition of the excessive fastening force, since stress due to the deformation is not directly transmitted to the first holding member, it is possible to suppress the influence due to the deformation of the clamp portion from being transmitted to the first holding member. Thereby, since it is possible to suppress the inclination of the first holding member due to the deformation of the clamp portion, it is possible to suppress the position of the projector held on the first holding member via the fixing member from being tilted. Thus, after the table installing device is installed on the table, the projected projection shape is projected in a predetermined projection shape, and the distortion can be suppressed. Accordingly, there is no need for adjustment so as to be a predetermined projection shape, and convenience for the installation of the table installing device is improved.

Application Example 2

In the table installing device according to the application example, it is preferable that the clamp portion includes a screw member that presses and interposes the top plate between the second holding member and the screw member by the rotational movement, and a screw-holding member that is joined to the second holding member and screws and holds the screw member.

According to this table installing device, since the clamp portion includes the screw member that presses and interposes the top plate between the second holding member and the screw member by the rotational movement, and the screw-holding member that is joined to the second holding member and screws and holds the screw member, even when the thickness of the top plate is thick, or, even when, for example, an obstacle such as a frame is included on a back surface side of the top plate or the like, the top plate can be interposed. Furthermore, even if the clamp portion is deformed due to the excessive rotational movement of the screw member and the addition of the excessive fastening force, since the stress due to the deformation is not directly transmitted to the first holding member, it is possible to suppress the influence due to the deformation of the clamp portion from being transmitted to the first holding member.

Application Example 3

In the table installing device according to the application example, it is preferable that the screw-holding member has a movement portion that screws the screw member and is able to move in a direction along the top plate surface.

According to this table installing device, since the screw-holding member has the movement portion that screws the screw member and is able to move in the direction along the top plate surface, for example, even when the obstacle such as the frame is included on the back surface side of the top plate or the like, the top plate can be interposed so as to avoid the obstacle by moving the movement portion, and thus a degree of freedom of installation is improved.

Application Example 4

In the table installing device according to the application example, it is preferable that the first holding member and/or the second holding member is formed in a tubular U shape.

According to this table installing device, since the first holding member and/or the second holding member are/is formed in the tubular U shape, the first holding member and/or the second holding member can be simply configured, and rigidity thereof can be improved.

Application Example 5

In the table installing device according to the application example, it is preferable that an image pickup device, which is electrically connected to the projector and transmits operation information performed with respect to the projection image projected from the projector to the projector, is fixed to the fixing member and/or the first holding member.

According to this table installing device, since the image pickup device is fixed to the fixing member capable of suppressing the influence due to the deformation of the clamp portion or the first holding member, the image is projected by a predetermined projection shape from the projector, and the image pickup device is able to transmit the operation information, which is performed with respect to the projection image corresponding to a predetermined projection shape, to the projector. Thus, since the image pickup device can be used without performing the adjustment to match with the predetermined projection shape, convenience of the table installing device is improved.

BRIEF DESCRIPTION OF THE DRAWINGS

The invention will be described with reference to the accompanying drawings, wherein like numbers reference like elements.

FIGS. 7A and 7B are perspective views that show a table installing device of the related art.

DESCRIPTION OF EXEMPLARY EMBODIMENTS

Hereinafter, embodiments will be described based on the drawings.

First Embodiment

Figure 1:
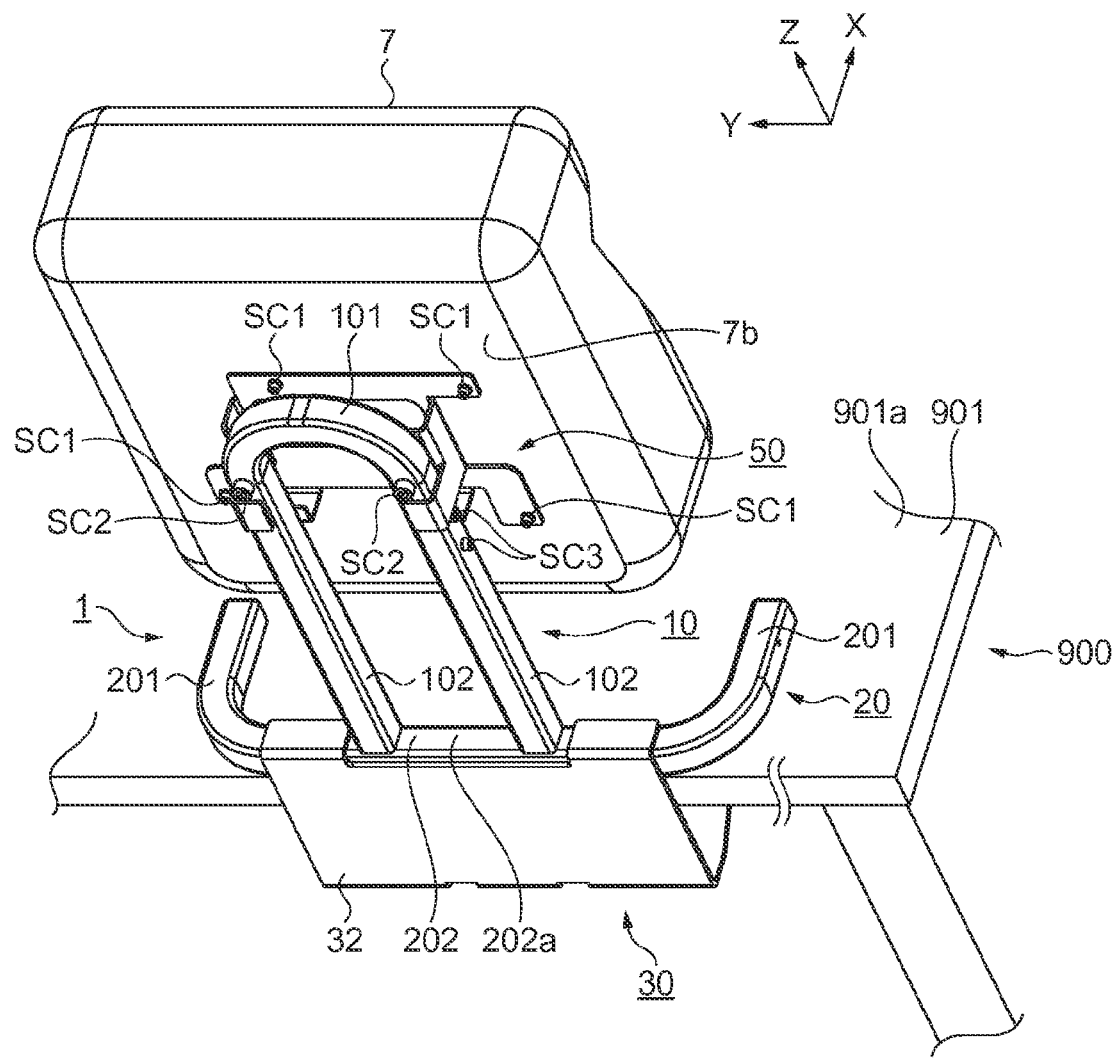
FIG. 1 is a perspective view showing a state where a projector is installed on a top plate by the use of a table installing device according to a first embodiment.
Figure 2:
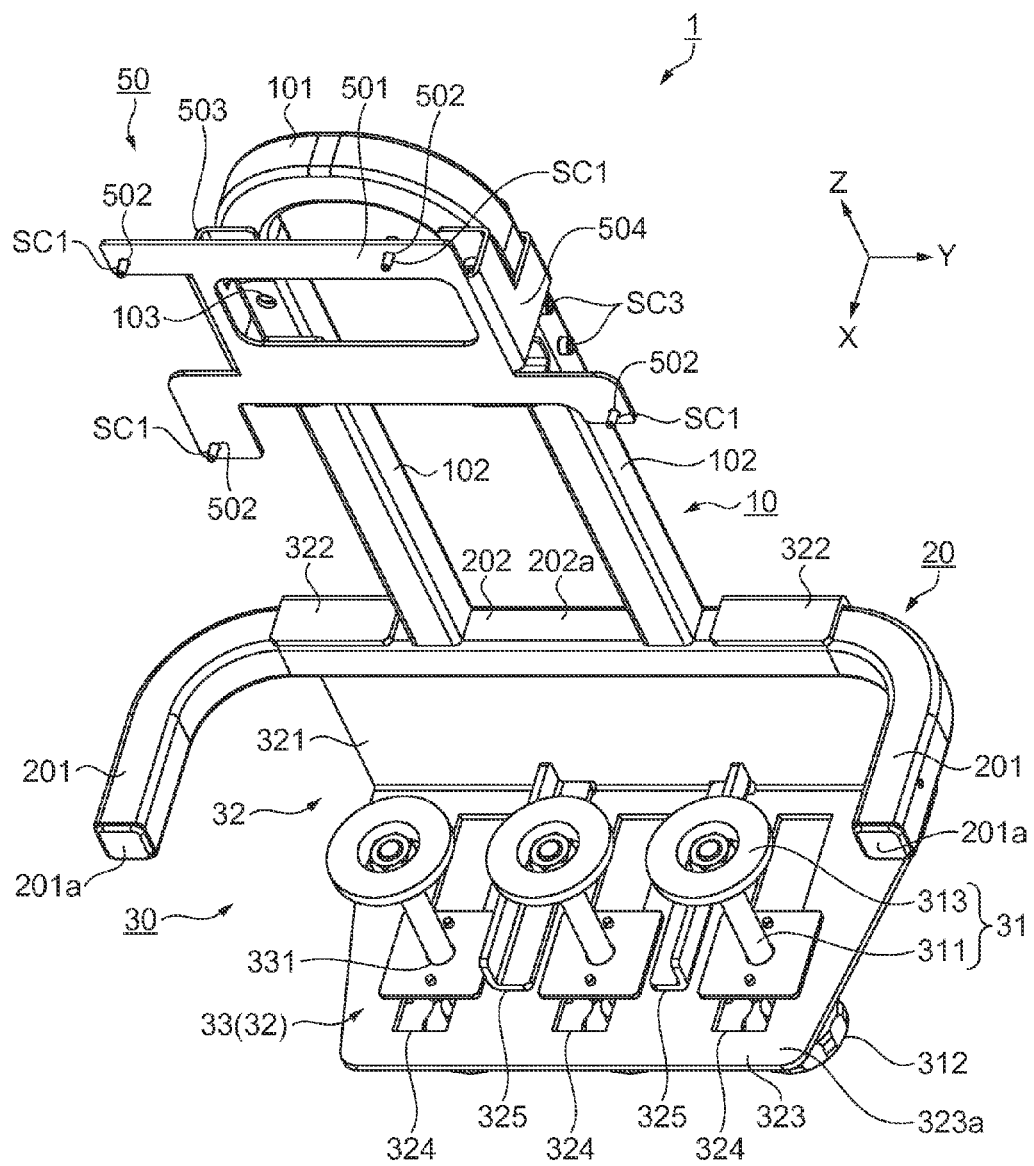
FIG. 2 is a perspective view of the table installing device.
Figure 3:
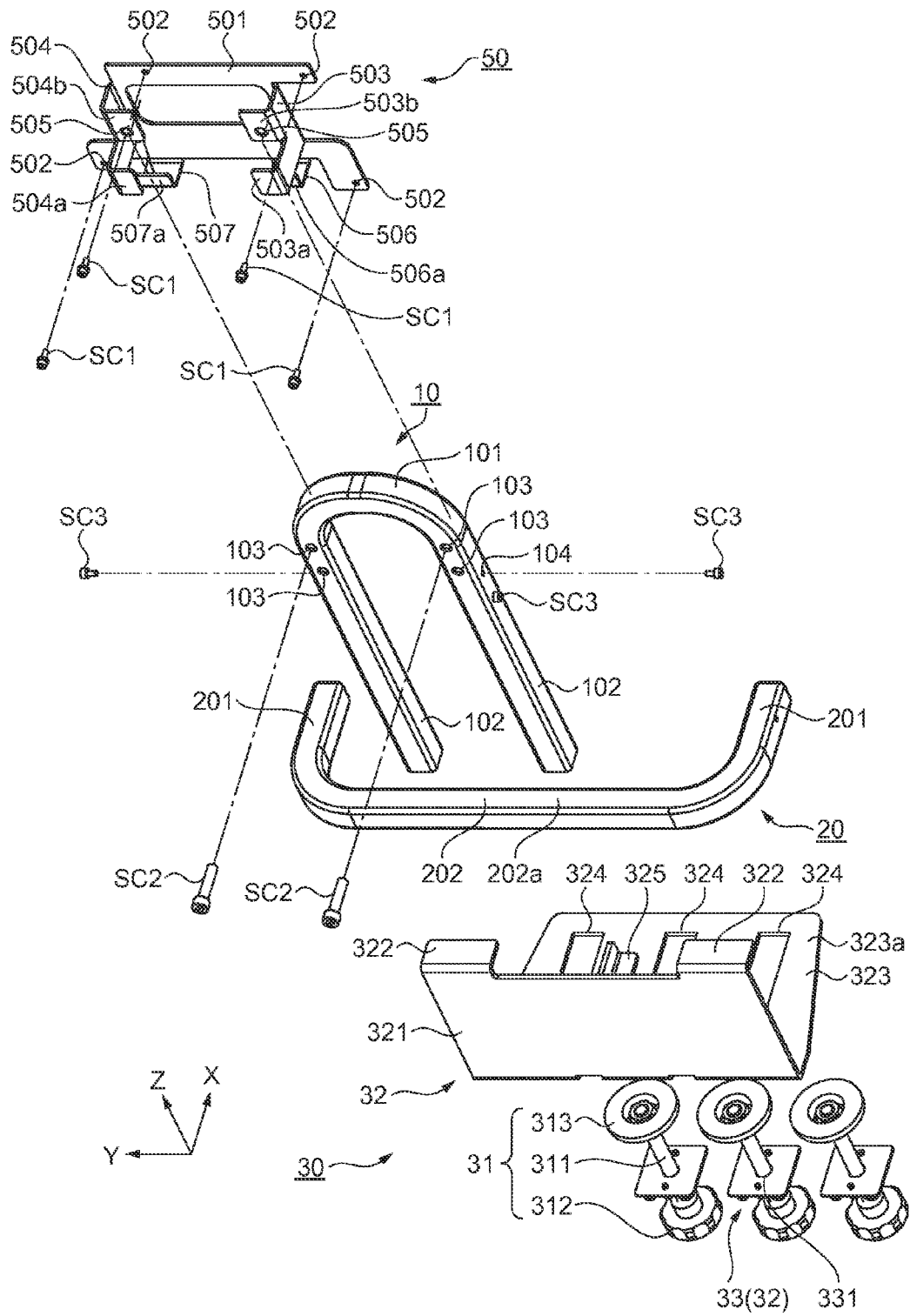
FIG. 3 is an exploded view of the table installing device.
Figure 4:
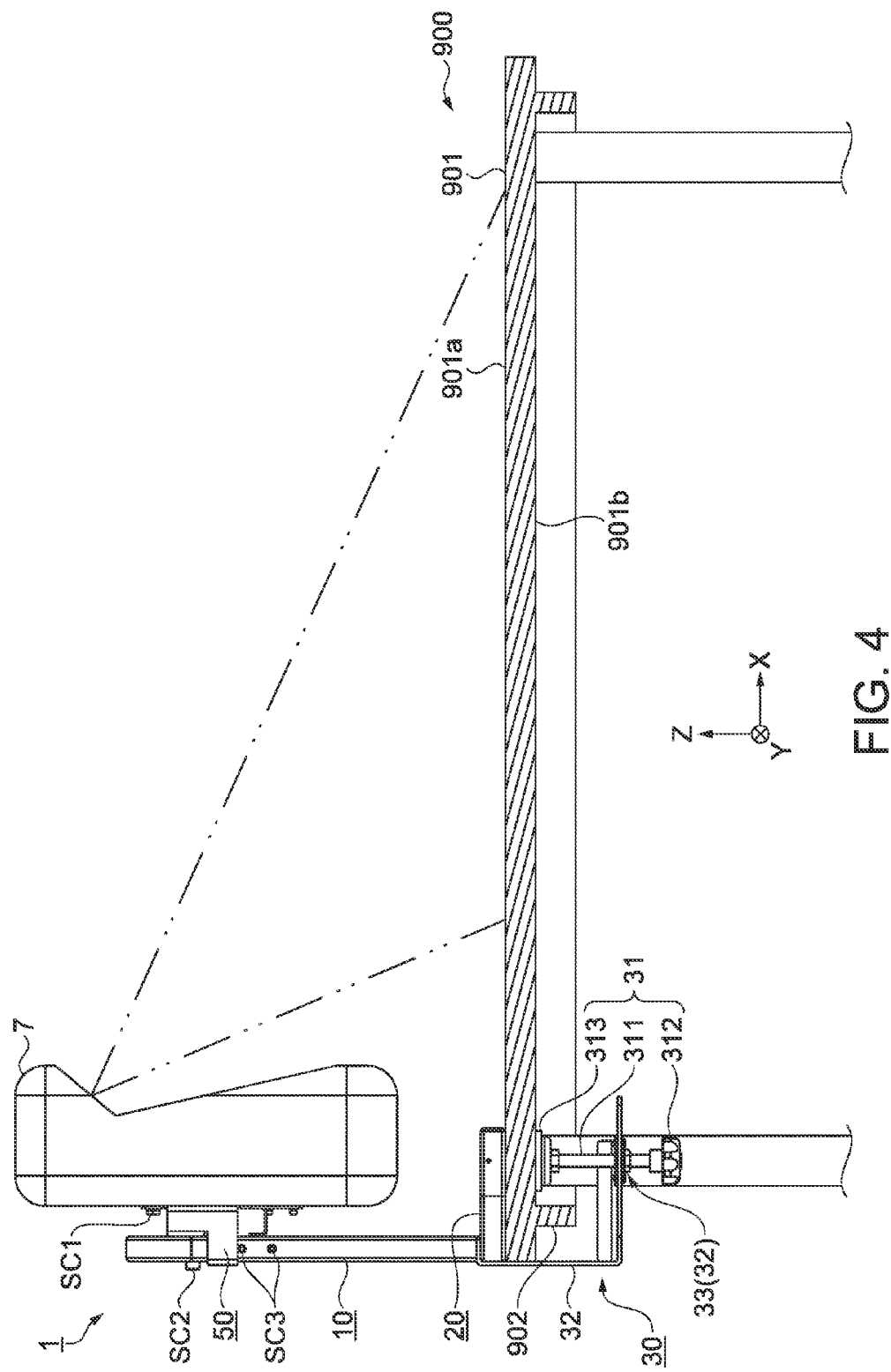
FIG. 4 is a side view of a state where the table installing device is installed on the top plate.

FIG. 1 is a perspective view showing a state where a projector 7 is installed on a top plate 901 by the use of a table installing device 1 according to a first embodiment. In addition, FIG. 1 is a perspective view in which the table installing device 1 is viewed from a rearward direction. FIG. 2 is a perspective view of the table installing device 1. In addition, FIG. 2 is a perspective view in which the table installing device 1 is viewed from a forward direction. FIG. 3 is an exploded view of the table installing device 1. In addition, FIG. 3 shows an exploded view in which the table installing device 1 is viewed from the rearward direction. FIG. 4 is a side view of a state where the table installing device 1 is installed on the top plate 901. A configuration and an installing method of the table installing device 1 will be described referring to FIGS. 1 to 4.

As shown in FIG. 1, the table installing device 1 of the present embodiment is a device that installs the projector 7 on the table 900. Moreover, the installed projector 7 projects images onto an upper surface (hereinafter, a top plate upper surface 901a) of a top plate 901 of the table 900 (see, FIG. 4).

As shown in FIG. 1, the table installing device 1 substantially includes a fixing member 50, a first holding member 10, a second holding member 20, and a clamp portion 30. The fixing member 50 is installed in a fixing portion (not shown) of the projector 7, and is held in the first holding member 10. The first holding member 10 holds the projector 7 by holding the fixing member 50, and is installed so as to standup with respect to the top plate upper surface 901a. The second holding member 20 is joined to the first holding member 10, and is installed along the top plate upper surface 901a. The clamp portion 30 is joined to the second holding member 20, and interposes the top plate 901 between the second holding member 20 and the clamp portion 30.

The projector 7 is a device that modulates the light flux emitted from a light source (not shown) in an optical modulation element (not shown) based on the image signal to form an optical image, and projects the formed optical image onto the top plate upper surface 901a via a projection lens (not shown) as the image light. The projector 7 of the present embodiment is constituted as a projector that includes a projection lens of short focus.

In the drawings that illustrate the present embodiment, a normal direction of the top plate upper surface 901a is set to a Z direction (an up-and-down direction), a gravitation direction is set to a −Z direction (a downward direction), and a direction opposite to the gravitation direction is set to a +Z direction (an upward direction). Furthermore, a direction, which is orthogonal to the Z direction and parallel to the direction in which the projector 7 projects the image light, is set to an X direction (a front-and-back direction), and a direction of projecting the image light is set to a +X direction (a forward direction), and an opposite direction thereof is set to a −X direction (a rearward direction). Furthermore, a direction orthogonal to the Z direction (the up-and-down direction) and the X direction (the front-and-back direction) is set to a Y direction (a left-and-right direction). When facing the table installing device 1 when viewed from the forward direction shown in FIG. 2, a left hand direction is set to a −Y direction (a left direction), and a right hand direction is set to a +Y direction (a right direction). In addition, X (the front-and-back), Y (left-and-right), and Z (up-and-down) indicating the direction will be suitably used in the following description.

As shown in FIGS. 1 and 2, the fixing member 50 is a member that fixes the projector 7, and is fixed to a first holding member 10 described later. As shown in FIGS. 2 and 3, the fixing member 50 is formed by the bending process or the like of a metal plate. The fixing member 50 has an approximately rectangular fixing member main body 501.

As shown in FIGS. 2 and 3, in the fixing member main body 501, four hole portions 502 for performing the screw fixation using a screw SC1 are formed in a fixing portion (not shown) formed on a bottom surface 7b (see FIG. 1) of the projector 7. Furthermore, end portions of the fixing member main body 501 in the left-and-right direction (Y direction) are bent in the rearward direction (−X direction), and leading ends thereof are formed with fixing pieces (a fixing piece 503 of the left direction, and a fixing piece 504 of the right direction) that are bent so as to approach each other.

The leading end of the fixing piece 503 of the left direction (−Y direction) is divided into two portions, and the fixing piece 503 has a step and is bent in the right direction (+Y direction). In addition, in the leading end portions of the fixing piece 503 which is divided into two, a portion bent in the rearward direction (−X direction) is set to a piece 503a, and a portion bent in a forward direction (+X direction) is set to a piece 503b. Furthermore, as in the fixing piece 503, the leading end of the fixing piece 504 of the right direction (+Y direction) is divided into two portions, and the fixing piece 504 has the same step and is bent in the left direction. In addition, in the fixing piece 504, a portion bent in the rearward direction (−X) direction is set to a piece 504a, and a portion bent in the forward direction (+X direction) is set to a piece 504b. Moreover, one screw hole 505 is formed in the pieces 503b and 504b, respectively.

Furthermore, on the left and right sides of the downward direction (−Z direction) end portion of the fixing member main body 501, fixing pieces (a fixing piece 506 of the left direction and a fixing piece 507 of the right direction) are formed which are bent in the rearward direction (−X direction), and leading end portions of which are bent in the upward direction (+Z direction).

When the fixing member 50 is held on the first holding member 10, the first holding member 10 is inserted through a region (between the piece 503a and the piece 503b, and between the piece 504a and the piece 504b) of the bent steps of the fixing pieces 503 and 504, a region (between the piece 503a and piece 506a) of the bent steps of the fixing pieces 503 and 506, and a region (between the piece 504a and the piece 507a) of the bent steps of the fixing pieces 504 and 507.

As shown in FIGS. 1 and 2, the first holding member 10 is a member that is joined to the second holding member 20, and fixes the fixing member 50 (the projector 7 fixed to the fixing member 50). The first holding member 10 has a structure that is able to adjust the fixing position of the fixing member 50 (the projector 7) to two stages in the up-and-down direction. In addition, the first holding member 10 is installed in a standup state so as to be approximately perpendicular to the top plate upper surface 901a when being installed on the table 900.

As shown in FIG. 3, the first holding member 10 is formed, by bending a tubular member made of metal having a rectangular cross-section in a U shape. The first holding member 10 includes a bending bent portion 101, and straight portions 102 that are connected to the bent portion 101 and each extend straight approximately in parallel.

Furthermore, in the vicinity of the portions of two straight portions 102 connected to the bent portion 101, two hole portions 103 for fixing the fixing member 50 to the first holding member 10 using screws by inserting the screw SC2 from the rearward direction to the forward direction are vertically formed in each of the straight portions 102.

Furthermore, on the left side surface of the straight portion 102 of the left side (−Y direction), screw holes 104 (the screw hole 104 of the downward direction is not shown) are each formed in the up-and-down direction. Furthermore, on the right side surface of the straight portion 102 of the right side (+Y direction), as in the straight portion 102 of the left side, screw holes 104 (not shown) are each formed in the up-and-down direction. The screw SC3 is screwed with the screw hole 104.

The screw SC3 screwed with the screw hole 104 is used for positioning the fixing member 50 by coming into contact with a head portion of the screw SC3, when performing the position adjustment (the height adjustment of the top plate upper surface 901a) of the fixing member 50. In addition, in the screw hole 104 of the first holding member 10, in the present embodiment, the screw SC3 is initially screwed with each screw hole 104 that becomes the lower side (−Z direction).

As shown in FIGS. 1 and 2, the second holding member 20 is a member that is joined to the first holding member 10 and is joined to a clamp portion 30 as described later. The second holding member 20 cooperates with the clamp portion 30 and interposes the top plate 901. As shown in FIGS. 1 and 4, the second holding member 20 is a member that is installed on the top plate upper surface 901a.

As shown in FIG. 3, as in the first holding member 10, the second holding member 20 is formed by bending a tubular member made of metal having a rectangular cross-section in a U shape. In addition, the first straight portions 201 serving as both ends bent in the U shape are each approximately parallel, and the interval thereof is formed so as to become wider than the width of the installed projector 7.

Furthermore, in the second holding member 20, a straight portion connecting the first straight portions 201 is referred to as a second straight portion 202. In addition, the second holding member 20 is installed in a state where the leading end portion 201a (see FIG. 2) of the first straight portion 201 is directed to the forward direction (+X direction) along the top plate upper surface 901a, when being installed on the table 900.

As shown in FIGS. 1 and 2, the first holding member 10 and the second holding member 20 are joined to each other by welding. Specifically, as shown in FIG. 1, in the state where the second holding member 20 is installed along the top plate upper surface 901a, the leading end portions of straight portions 102 of both sides of the first holding member 10 are located on the upper surface 202a of the central portion of the second straight portion 202 of the second holding member 20, and the leading end portions are welded to the second straight portion 202 so that the first holding member 10 is perpendicular to the top plate upper surface 901a.

As shown in FIGS. 1 and 2, the clamp portion 30 is a member that is joined to the second holding member 20 and interposes the top plate 901, together with the second holding member 20. As shown in FIGS. 2 and 3, the clamp portion 30 includes a screw member 31 that presses and interposes the top plate 901 between the second holding member 20 and the screw member 31, and a screw-holding member 32 that is joined to the second holding member 20, and screws and holds the screw member 31. Furthermore, the screw-holding member 32 includes a movement portion 33 that screws the screw member 31 and is able to move in the direction along the upper surface 323a of the screw-holding member 32.

The screw-holding member 32 is formed by bending process or the like of the metallic plate. The screw-holding member 32 has a substantially rectangular holding member main body 321. In a corner portion of an upward direction (+Z direction) end portion of the holding member main body 321, two piece portions 322 that are bent in the forward direction (+X direction) are formed. Furthermore, in a downward direction (−Z direction) end portion of the holding member main body 321, a piece portion 323 that is bent in the forward direction (+X direction) is formed.

As shown in FIG. 3, three long hole portions 324 permitting the screw member 31 to move in the front-and-back direction (X direction) are formed in parallel in the piece portion 323. The long hole portions 324 are configured so as to enable to move a movement portion 33 described later in the front-and-back direction (X direction) along the upper surface 323a of the piece portion 323.

Furthermore, on the upper surface 323a of the piece portion 323, among the three long hole portions 324, two reinforcement members 325 having an L-shaped cross-section are installed along the long hole portions 324. The reinforcement members 325 reduce the deformation of the screw-holding member 32 due to the excessive fastening of the screw member 31.

The movement portion 33 is formed in an approximately rectangular shape, and is formed with a groove portion (not shown) guided to an inner circumferential portion of the long hole portion 324, and a screw hole 331 that is screwed with the screw member 31 to enable the rotational movement of the screw member 31. The groove portion of the movement portion 33 is guided to the inner circumference and the upper and lower surfaces of the long hole portion 324, and the movement portion 33 is able to move along the long hole portion 324.

As shown in FIGS. 1 and 2, the screw-holding member 32 and the second holding member 20 are joined to each other by welding. Specifically, as shown in FIG. 1, in a state where the second holding member 20 is installed along the top plate upper surface 901a, the two piece portions 322 of the screw-holding member 32 are located on the upper surface 202a of the end portion of the second straight portion 202 of the second-holding member 20, and the piece portions 322 are welded to the second straight portion 202.

The screw member 31 includes a threaded screw portion 311, a knob 312 fixed to one leading end portion of the screw portion 311 to rotate the screw portion 311, and a pad 313 that is fixed to the other leading end portion of the screw portion 311 in a rotationally movable manner.

The screw member 31 screws the screw portion 311, to which the knob 312 is fixed, to the screw hole 331 of the movement portion 33 from the downward direction (−Z direction), and then fixes the pad 313 to the other leading end portion of the screw portion 311 extending in the upward direction (+Z direction) from the movement portion 33. Thereby, the screw-holding member 32 is held on the movement portion 33 (the screw-holding member 32).

Next, a method of installing of the table installing device 1 onto the table 900 (the top plate 901), and a method of installing the projector 7 onto the table installing device 1 will be described.

When the table installing device 1 is installed on the table 900, the fixing member 50 is separated from the finally attached first holding member 10. Moreover, the table installing device 1 except the fixing member 50 is installed on the table 900 (the top plate 901). In addition, the separated fixing member 50 is fixed to the projector 7.

When the table installing device 1 except the fixing member 50 is installed on the table 900, first, the table installing device 1 is inserted from the side surface direction of the top plate 901. Moreover, as shown in FIG. 4, the second holding member 20 is located on the top plate upper surface 901a, and the screw member 31 is installed so as to climb over the frame 902 installed on the top plate lower surface 901b.

The movement portion 33 of the present embodiment can move in a direction along the upper surface 323a of the screw-holding member 32 (in other words, in a direction along the top plate upper surface 901a). Thus, when the screw member 31 is located so as to climb over the frame 902, the screw member 31 is grasped, and the movement portion 33 is moved and adjusted along the long hole portion 324.

Next, the knob 312 of the screw member 31 is rotated, the screw portion 311 is extended in the upward direction (+Z direction) from the movement portion 33, and the pad 313 is brought into contact with the top plate lower surface 901b. Moreover, the knob 312 is further rotated (fastened), and the top plate lower surface 901b is pressed against the pad 313 and is temporarily fixed. Thereby, the table installing device 1 can be fixed (temporarily fixed) to the top plate 901.

Next, in order to determine the installation height of the projector 7, the screw SC3 is screwed with the screw hole 104. In addition, as described above, the screw SC3 is initially screwed with each screw hole 104 becoming the lower side (−Z direction) of the first holding member 10. Thus, when the projector 7 is set to the height of the lower side (−Z direction), this state may remain.

However, as in the present embodiment, when the projector 7 is set to the height of the upper side (+Z direction), the screw SC3 is screwed with the screw hole 104 of the upper side, respectively. In this case, the screw SC3 initially screwed with the screw hole 104 of the lower side may be screwed with the screw hole 104 of the upper side as it is.

Next, the projector 7 is held and installed on the first holding member 10. Specifically, the fixing member 50 fixed to the projector 7 is installed in the region of the step of the fixing member 50 from the upward direction of the first holding member 10 so as to penetrate through the straight portion 102 of the first holding member 10. Incidentally, the region of the step of the fixing member 50 is between the piece 503*a* and the piece 503*b*, between the piece 503*a* and the piece 506*a*, between the piece 504*a* and the piece 504*a*, and between the piece 504*a* and the piece 507*a*.

When the upper end portion of the straight portion 102 of the first holding member 10 is inserted through the region of the step of the fixing member 50 and the fixing member 50 is further moved in the downward direction, the fixing member 50 comes into contact with the screw SC3 and the movement thereof to the downward direction is stopped. Thereby, the installation height of the fixing member 50 (the projector 7) can be determined.

Thereafter, the screw SC2 is inserted through the upward hole portion 103 of the first holding member 10, and the screw SC2 is screwed with each screw hole 505 of the pieces 503*b* and 504*b* of the fixing member 50. Thereby, the fixing member 50 (the projector 7) can be held and fixed by the first holding member 10.

Next, the table installing device 1 is definitely fixed to the top plate 901, by rotating again and fastening the knob 312 of the temporarily fixed screw member 31. Thereby, as shown in FIG. 4, the table installing device 1 interposes the top plate 901 between the second holding member 20 and the clamp portion 30, and enters a state of holding the projector 7.

By the above-mentioned assembly, the installation of the table installing device 1 onto the top plate 901, and the installation of the projector 7 onto the table installing device 1 are completed.

As shown in FIG. 4, when the image is actually projected (shown by a two-dot chain line in FIG. 4) onto the top plate upper surface 901*a* from the projector 7 installed on the table installing device 1, in the present embodiment, since the projector 7 is installed on the upper position, the projection shape is expanded in size and projected, compared to a case of being installed on the lower position.

Since the projector 7 of the present embodiment includes a zoom adjustment dial (not shown), the size of the projection shape can be expanded or reduced. Thus, a user is able to expand or reduce the size of the projection shape in response to the area of the top plate upper surface 901*a*, by rotating the zoom adjustment dial.

In the present embodiment, when the screw member 31 of the clamp portion 30 is excessively rotated and the top plate lower surface 901*b* is fastened by the excessive fastening force, the screw-holding member 32 is deformed. However, the clamp portion 30 of the present embodiment is joined to the second holding member 20, but is not directly joined to the first holding member 10. In other words, the clamp portion 30 is connected to the first holding member 10 via the second holding member 20.

Thus, even when the screw-holding member 32 of the clamp portion 30 is deformed, since the stress due to the deformation is not directly transmitted to the first holding member 10, the influence due to the deformation of the screw-holding member 32 is suppressed from being transmitted to the first holding member 10. Thus, even when the screw-holding member 32 is deformed, the first holding member 10 is suppressed from being inclined with respect to the top plate upper surface 901*a*.

Thereby, as shown in FIG. 4, the projection shape of the projection image projected from the projector 7 is projected in a predetermined projection shape and size, and can be suppressed from being distorted. In addition, the predetermined projection shape of the present embodiment is a square or rectangular shape in which a horizontal and vertical aspect ratio is set. Thus, when using the table installing device 1 of the present embodiment, the projection shape of the projection image projected from the projector 7 is projected on the top plate upper surface 901*a* by the predetermined projection shape and size, the projection image can be immediately used.

Incidentally, for example, when the projection shape is set in a rectangular shape, and the first holding member 10 is inclined in the forward direction (+X direction), the projection shape is projected as a trapezoidal shape in which the side of the forward direction is short, and the side of the rearward direction is long. Furthermore, on the contrary, when the first holding member 10 is inclined in the rearward direction (−X direction), the projection shape is projected as a trapezoidal shape in which the side of the forward direction is long and the side of the rearward direction is short. In such a case, since there is a need to operate the projection correction function incorporated in the projector 7, and adjust the distorted shape (the trapezoidal shape) so as to be a rectangular shape, it takes time for adjustment.

According to the above-mentioned first embodiment, the following effects can be obtained.

In the table installing device 1 of the present embodiment, the fixing member 50 is fixed to the projector 7. Moreover, the first holding member 10 is installed so as to stand up with respect to the top plate upper surface 901*a* of the table 900, and holds the projector 7 via the fixing member 50. The second holding member 20 is joined to the first holding member 10, and is installed on the top plate upper surface 901*a*. The clamp portion 30 is joined to the second holding member 20, and interposes the top plate 901 between the second holding member 20 and the clamp portion 30. With this configuration, the clamp portion 30 is joined to the second holding member 20, but is not directly joined to the first holding member 10. In other words, the clamp portion 30 is connected to the first holding member 10 via the second holding member 20. Thus, even when the clamp portion 30 is deformed by the application of the excessive fastening force, since the stress due to the deformation is not directly transmitted to the first holding member 10, it is possible to suppress the influence due to the deformation of the clamp portion 30 from being transmitted to the first holding member 10.

Thereby, since the inclination of the first holding member 10 due to the deformation of the clamp portion 30 can be suppressed, it is possible to suppress the position of the projector 7 held on the first holding member 10 via the fixing member 50 from being inclined. Thus, after the table installing device 1 is installed on the table 900, the projected projection shape is projected in a predetermined projection shape, and can be suppressed from being distorted. Thus, there is no need to adjust the projection shape so as to be a predetermined projection shape, and the installation of the table installing device 1 is more convenient.

According to the table installing device 1 of the present embodiment, the clamp portion 30 includes the screw member 31 that presses and interposes the top plate 901 between the second holding member 20 and the screw member 31 by the rotational movement, and the screw-holding member 32 that is joined to the second holding member 20, screws and holds the screw member 31. Accordingly, even when the top plate 901 is thick, or even when the frame 902 is included on the top plate lower surface 901*b*, the top plate 901 can be interposed. Furthermore, even when the screw member 31 excessively rotationally moves and the clamp portion 30 (the screw-holding member 32) is deformed by the addition of the excessive fastening force, since the stress due to the deformation is not directly transmitted to the first holding member 10, it is possible to suppress the influence due to the deformation of the screw-holding member 32 from being transmitted to the first holding member 10.

According to the table installing device 1 of the present embodiment, since the screw-holding member 32 has the movement portion 33 that screws the screw member 31 and is able to move in the direction along the top plate upper surface 901a, even when the frame 902 is included on the top plate lower surface 901b, the top plate 901 can be interposed to avoid the frame 902 by moving the movement portion 33, and thus the degree of freedom of installation is improved.

According to the table installing device 1 of the present embodiment, since the first holding member 10 and the second holding member 20 are formed in a tubular U shape, the first holding member 10 and the second holding member 20 can be simply configured, and the rigidity thereof can be improved.

According to the table installing device 1 of the present embodiment, since the first holding member 10 and the second holding member 20 are formed in the tubular U shape, the members are simple and the appearance can be improved.

Second Embodiment

Figure 5:
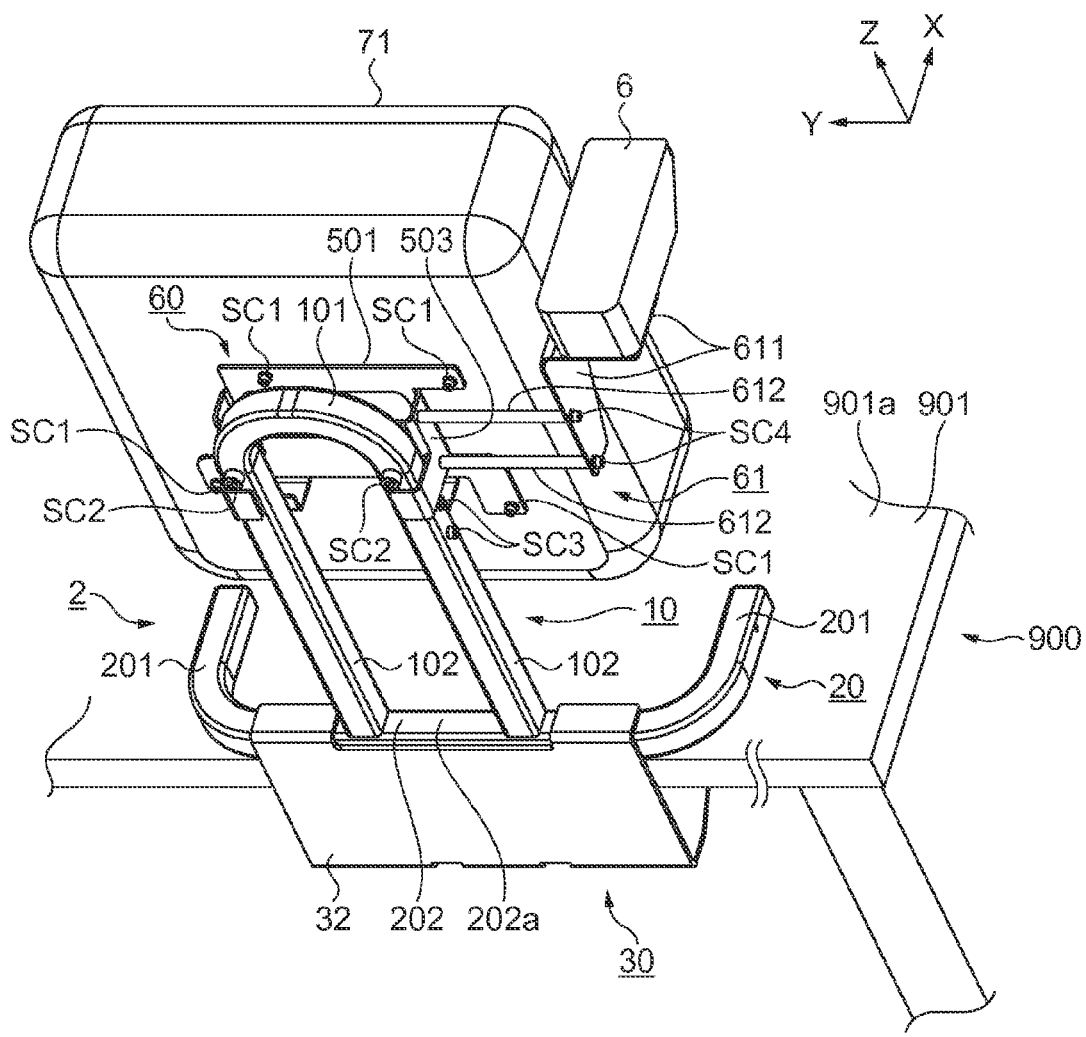
FIG. 5 is a perspective view showing a state where the projector is installed on the top plate by the use of the table installing device according to a second embodiment.
Figure 6:
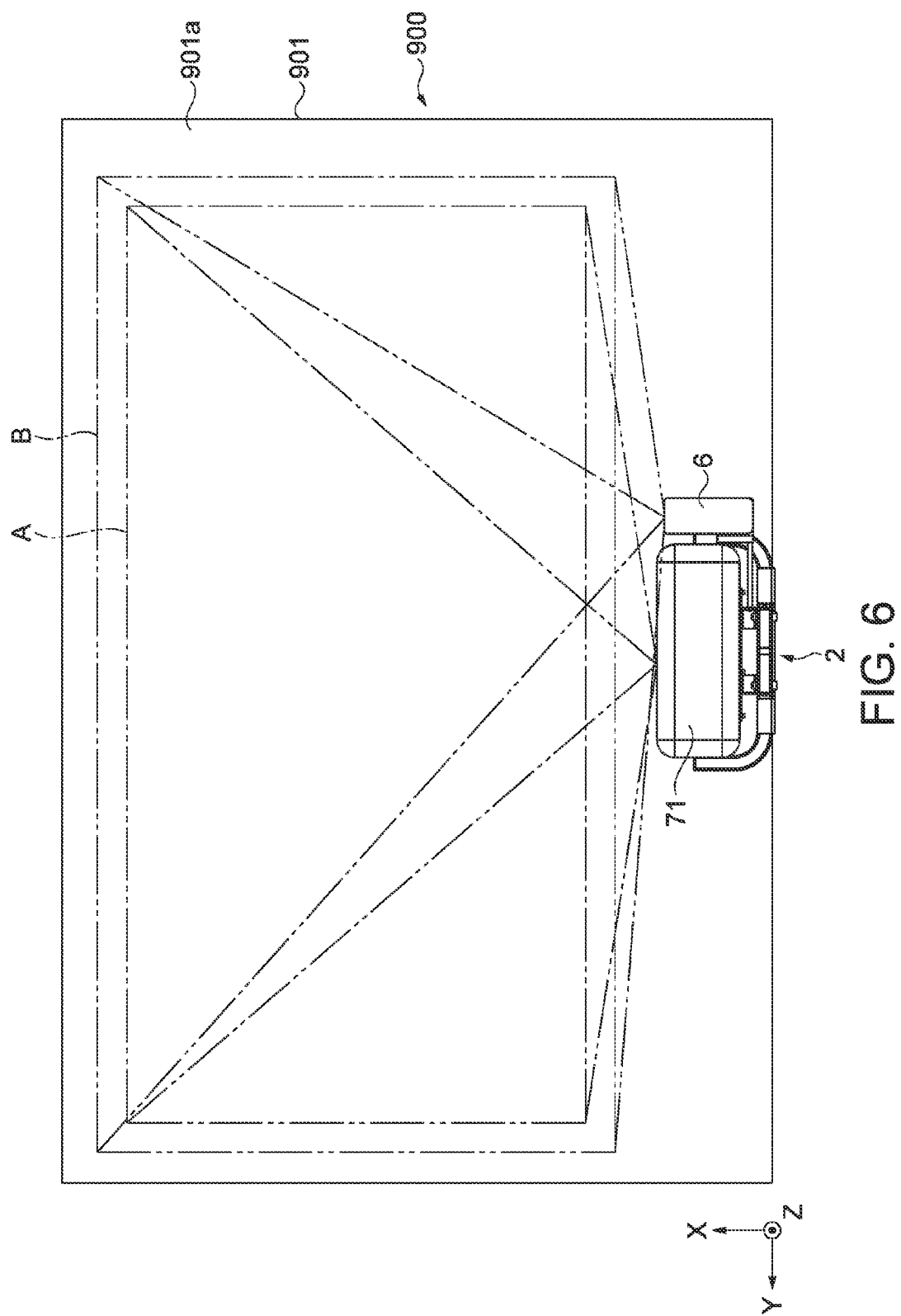
FIG. 6 is a plan view in a case where the table installing device is installed on the top plate.

FIG. 5 is a perspective view showing a state where a projector 71 is installed on the top plate 901 by the use of a table installing device 2 according to s second embodiment. In addition, FIG. 5 is a perspective view in which the table installing device 2 is viewed from the rearward direction. FIG. 6 is a plan view of a case where the table installing device 2 is installed on the top table 901. Incidentally, FIG. 6 shows a plan view in which the table installing device 2 and the table 900 are viewed from the upward direction, and shows a projection external form A of the projection image projected from the projector 71 and an image pickup external form B of the image pickup device 6. A configuration and an operation of the table installing device 2 will be described with reference to FIGS. 5 and 6.

As shown in FIG. 5, a configuration of a fixing member 60 of the table installing device 2 of the present embodiment is different from the configuration of the fixing member 50 of the first embodiment, as compared to the table installing device 1 of the first embodiment. Other configurations are the same as those of the first embodiment. The fixing member 60 of the present embodiment has approximately a structure in which a device fixing portion 61 is added to the fixing member 50 of the first embodiment, and other configurations are the same as those of the fixing member 50. Incidentally, the same configurations are denoted by the same reference numerals.

As shown in FIG. 5, the fixing member 60 of the present embodiment is a member for fixing the projector 71 and the image pickup device 6 at predetermined positions. In the fixing member 60, a device fixing portion 61 adapted to fix the image pickup device 6 is installed in the fixing piece 503 of the left direction (−Y direction) of the fixing member main body 501. The device fixing portion 61 includes a fixing plate 611 that is provided in the left direction of the fixing piece 503 and fixes the image pickup device 6, and a fixing plate support member 612 that supports the fixing plate 611 on the fixing piece 503.

The fixing plate support member 612 is constituted by two rod-like members, and both end portions thereof are subjected to threading process. The fixing plate 611 is formed in a state where the metallic plate is approximately perpendicularly bent. One side of the fixing plate 611 is formed with two hole portions (not shown) and is fixed to the fixing plate support member 612. The image pickup device 6 is fixed to the other side of the fixing plate 611.

The fixing piece 503 is formed with two hole portions (not shown). Moreover, the fixing piece 503 and the fixing plate support member 612 are fixed to each other via the above-mentioned hole portions of the fixing piece 503, by screwing of the screw SC4. Furthermore, the fixing plate support member 612 and the fixing plate 611 are fixed to each other via the hole portions of the fixing plate 611, by screwing of the screw SC4.

With the above-mentioned assembling, the device fixing portion 61 is installed on the fixing piece 503. Incidentally, the image pickup device 6 fixed to the device fixing portion 61 enters a state of being located on the left side surface portion of the projector 71. Moreover, as shown in FIG. 6, the image pickup device 6 images an image pickup external form B that is set to be slightly greater than the projection external form A of the projection image.

The projector 71 of the present embodiment constitutes an interactive system by the image pickup device 6 and a light-emitting pen (not shown) described later, the image projected from the projector 71 is imaged by the image pickup device 6, and the operation of a user using the light-emitting pen performed on the projection image can be recognized by a control unit (not shown) in the projector 71. In addition, the image pickup device 6 and the projector 71 are electrically connected to each other by a cable (not shown).

The light-emitting pen includes a pressing switch and a light-emitting diode that emits infrared beam, on a pen tip of a pen-shaped main body. Moreover, when a user presses the pressing switch, by performing the operation of pressing the pen tip of the light-emitting pen against the top plate upper surface 901a, the light-emitting diode emits the light.

The image pickup device 6 transmits the operation information using the light-emitting pen, which is performed on the projection image projected from the projector 71, to the projector 71. Specifically, the image pickup device 6 images the infrared beam emitted from the light-emitting pen, and transmits the image to the projector 71 as an image pickup data (operation information). The projector 71 starts the position specification function stored in the projector 71, based on the image pickup data transmitted from the image pickup device 6, and specifies the position, where the infrared beam is emitted, on the top plate upper surface 901a.

As shown in FIG. 6, the projector 71 and the image pickup device 6 of the present embodiment are set so that the projection external form A serving as a projection range of the projected image and the image pickup external form B serving as an image pickup range imaged by the image pickup device 6 are corrected in the projector 71, and the respective positions correspond to each other. Moreover, as described above, the projector 71 is configured as an interactive system, and when the top plate upper surface 901a is pressed by the light-emitting pen in response to a predetermined portion of the projection image, the projector 71 has a function that specifies the pressed position (the position where the infrared beam is emitted), and processes which portion of the image is pressed by the light-emitting pen in connection with the position in the image.

An example of use as the interactive system will be described.

A user makes the projector 71 to project, for example, a menu image for controlling the projector 71. Moreover, the user presses the top plate upper surface 901a located at a position corresponding to a menu intended to be operated using an electronic pen, in the projected menu image. With this operation, the projector 71 specifies and processes the position where the infrared beam is emitted via the image pickup device 6, whereby the user is able to operate the menu corresponding to the position.

According to the above-mentioned second embodiment, the same effects as those of the first embodiment can be obtained, and in addition, the following effects can be obtained.

The fixing member 60 in the table installing device 2 of the present embodiment has a configuration in which the device fixing portion 61 is added to the fixing member 50 of the first embodiment, as a basic configuration. Moreover, the image pickup device 6 is fixed to the device fixing portion 61. With this configuration, as in the first embodiment, the table installing device 2 is able to suppress the influence to the first holding member 10 and the fixing member 60 due to the deformation of the clamp portion 30. Thereby, an image is projected from the projector 71 in a predetermined projection shape (the projection external form A), the image pickup device 6 images the range of a predetermined image pickup external form B, and is able to transmit the operation information, which is performed on the projection image using the light-emitting pen, to the projector 71. Thus, as in the first embodiment, since the projected projection shape is projected in a predetermined projection shape (the projection external form. A), and can be suppressed from being distorted, there is no need to adjust the projection shape so as to be a predetermined projection shape. Furthermore, in the present embodiment, since it is also possible to suppress the image pickup external form B of the image pickup device 6 from being distorted, the image pickup device 6 can be used without performing the adjustment to match with the projection external form A, and thus the convenience of the table installing device 2 is improved.

In addition, various modifications, improvements or the like can be added and performed within the scope that does not depart from the gist thereof, without being limited to the above-mentioned embodiments. A modification example will be described below.

In the table installing device 1 of the above-mentioned first embodiment, the clamp portion 30 includes the screw member 31 and the screw-holding member 32. However, without being limited thereto, the clamp portion may have a configuration that is joined to the second holding member 20, and is able to interpose the top plate 901 between the second holding member 20 and the clamp portion. This is also similar to the above-mentioned second embodiment.

In the table installing device 1 of the above-mentioned first embodiment, although the screw-holding member 32 has the movement portion 33 that screws the screw member 31 and is able to move in the direction along the top plate upper surface 901a, the screw-holding member 32 may not have the movement portion 33. This is also similar to the above-mentioned second embodiment.

In the table installing device 1 of the above-mentioned first embodiment, the first holding member 10 and the second holding member 20 are each formed in a tubular U shape. However, without being limited thereto, one of the first holding member 10 and the second holding member 20 may be formed in a tubular U shape. Furthermore, this is also similar to the above-mentioned second embodiment.

In the table installing device 1 of the above-mentioned first embodiment, the first holding member 10 and the second holding member 20 are each formed in a tubular U shape. However, without being limited thereto, the first holding member 10 and the second holding member 20 may not be formed each in a tubular U shape. This is also similar to the above-mentioned second embodiment.

In the table installing device 1 of the above-mentioned first embodiment, the first holding member 10 and the second holding member 20 are joined to each other by welding. Furthermore, the second holding member 20 and the clamp portion 30 are joined to each other by welding. However, without being limited thereto, the members may be joined to each other by the adhesive fixation, the screw fixation using the screw, the fixation due to fitting between the pin and the hole, or the like. This is also similar to the above-mentioned second embodiment.

In the table installing device 1 of the above-mentioned first embodiment, the clamp portion 30 is joined to the second holding member 20. However, the clamp portion 30 may be joined to members (members other than the second holding member 20) other than the fixing member 50 adapted to fix the projector 7, the first holding member 10 and the member directly connected to the fixing member 50 and the first holding member 10. This is also similar to the above-mentioned second embodiment.

In the table installing device 2 of the above-mentioned second embodiment, the image pickup device 6 is fixed to the fixing member 60 capable of suppressing the influence due to the deformation of the clamp portion 30. However, without being limited thereto, the image pickup device 6 may be fixed to the first holding member 10 capable of suppressing the influence due to the deformation of the clamp portion 30.

In the table installing device 2 of the above-mentioned second embodiment, the device fixing portion 61 configured to fix the image pickup device 6 is constituted by the fixing plate 611 and the fixing plate support member 612. However, this configuration is not limited thereto.

The entire disclosure of Japanese Patent Application No. 2012-111576, filed May 15, 2012 is expressly incorporated by reference herein.

What is claimed is:

1. A table installing device that installs a projector on a table, the device comprising:
   a fixing member fixed to the projector;
   a first holding member that holds the projector by holding the fixing member, and is installed so as to stand up with respect to a top plate surface of the table;
   a second holding member that is joined to the first holding member and is installed on the top plate surface; and
   a clamp portion that is joined to the second holding member, and interposes the top plate between the second holding member and the clamp portion,
   wherein the clamp portion includes:
   a screw member that presses and interposes the top plate between the second holding member and the screw member by the rotational movement, and
   a screw-holding member that is joined to the second holding member, screws and holds the screw member.

2. The table installing device according to claim 1, wherein the screw-holding member has a movement portion that screws the screw member and is able to move in a direction along the top plate surface.

3. The table installing device according to claim 1, wherein the clamp portion is connected to the first holding member via the second holding member.

4. The table installing device according to claim 1, wherein the first holding member and/or the second holding member are/is formed in a tubular U shape.

5. The table installing device according to claim 1, wherein the screw-holding member has a movement portion that screws the plurality of screw members and is able to move in a direction along the top plate surface, and the screw members are placed so as to be each independently movable.

6. The table installing device according to claim 1,
wherein an image pickup device which is electrically connected to the projector and transmits operation information, which is performed with respect to a projection image projected from the projector, to the projector is fixed to the fixing member and/or the first holding member.

* * * * *